United States Patent
Hans et al.

(10) Patent No.: US 7,263,089 B1
(45) Date of Patent: Aug. 28, 2007

(54) METHOD FOR OPERATING A MOBILE RADIO NETWORK

(75) Inventors: Martin Hans, Hildesheim (DE); Frank Kowalewski, Salzgitter (DE); Josef Laumen, Hildesheim (DE); Gunnar Schmidt, Wolfenbuettel (DE); Siegfried Baer, Pforzheim (DE); Mark Beckmann, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 1077 days.

(21) Appl. No.: 10/148,773

(22) PCT Filed: Oct. 25, 2000

(86) PCT No.: PCT/DE00/03757

§ 371 (c)(1),
(2), (4) Date: Sep. 16, 2002

(87) PCT Pub. No.: WO01/41349

PCT Pub. Date: Jun. 7, 2001

(30) Foreign Application Priority Data

Dec. 4, 1999 (DE) .................... 199 58 510

(51) Int. Cl.
H04Q 7/00 (2006.01)
H04Q 7/22 (2006.01)
H04B 7/216 (2006.01)
H04M 1/725 (2006.01)

(52) U.S. Cl. ............... 370/349; 370/328; 370/342; 455/412.2

(58) Field of Classification Search ........ 370/216–230, 370/312–338, 349–392, 468–474; 455/412–428, 455/452–560
See application file for complete search history.

(56) References Cited

U.S. PATENT DOCUMENTS

| | | | |
|---|---|---|---|
| 6,205,140 B1 * | 3/2001 | Putzolu et al. | 370/389 |
| 6,434,133 B1 * | 8/2002 | Hamalainen | 370/338 |
| 6,504,836 B1 * | 1/2003 | Li et al. | 370/349 |
| 6,614,776 B1 * | 9/2003 | Proctor, Jr. | 370/342 |
| 6,658,235 B1 * | 12/2003 | Tolmunen et al. | 455/67.13 |
| 6,717,928 B1 * | 4/2004 | Kalliokulju et al. | 370/335 |
| 6,848,008 B1 * | 1/2005 | Sevanto et al. | 709/249 |
| 2005/0050429 A1 * | 3/2005 | Proctor, Jr. | 714/758 |

FOREIGN PATENT DOCUMENTS

DE 198 47 679 5/1999
FR 2 769 447 4/1999

OTHER PUBLICATIONS

Aikawa et al., *IEEE International Conference on Communications,* IEEE, New York, Jun. 23, 1996, pp. 454-458.

* cited by examiner

*Primary Examiner*—Man U. Phan
(74) *Attorney, Agent, or Firm*—Kenyon & Kenyon LLP

(57) ABSTRACT

A method for operating a mobile radio network is proposed which makes possible improved error protection of the control data to be transmitted while requiring as small a transmission bandwidth as possible. In this context, payload data is transmitted in payload data packets. The payload data packets are each assigned at least one header information item containing control data for routing the payload data packets in the mobile radio network. The control data and the payload data are transmitted with different error protection.

5 Claims, 1 Drawing Sheet

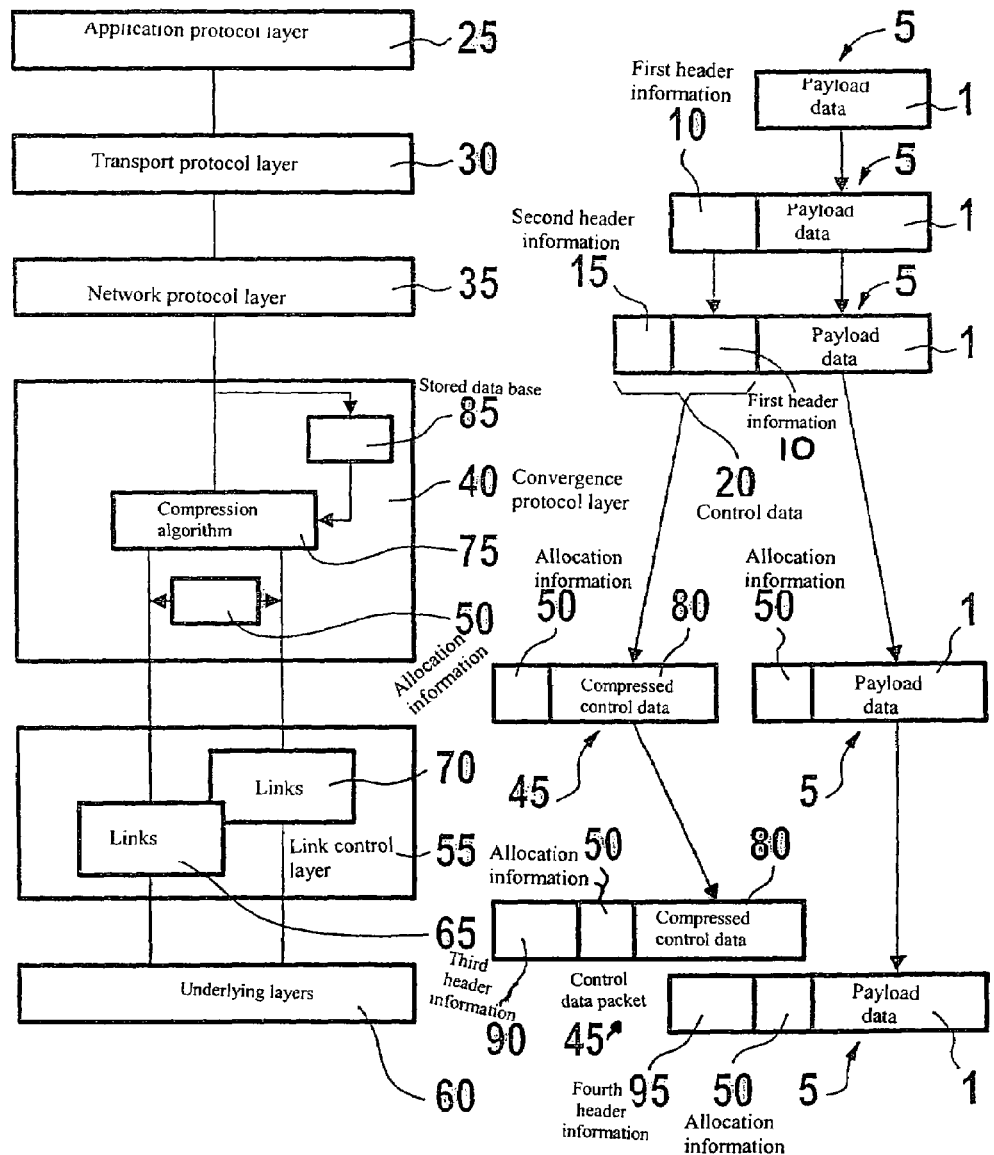

METHOD FOR OPERATING A MOBILE RADIO NETWORK

FIELD OF THE INVENTION

The present invention relates to a method for operating a mobile radio network.

BACKGROUND INFORMATION

A method for operating a mobile radio network in which payload data is transmitted in payload data packets is already known from German Published Patent Application No. 198 47 679. In this context, each payload data packet is assigned control data in the form of at least one header information item, the control data being required for passing on the payload data in the mobile radio network.

The publication "Forward Error Correction Schemes For Wireless ATM Systems", Aikawa S. et al., IEEE International Conference an Communications (ICC), US, New York, IEEE Jun. 23, 1996, describes a method for operating a mobile radio network in which payload data is transmitted in payload data packets, and the payload data packets are each assigned at least one header information item containing control data for routing the payload data packets in the mobile radio network, the control data and the payload data being transmitted with different error protection. The publication "General Packet Radio Service (GPRS); Mobile Station (MS)-Servicing GPRS Support Note (SGSN); Sub-Network Dependent Convergence Protocol (SNDCP), ETSI, 1998, describes that the data packets are prefixed with an allocation information item, which informs the receiver of the order of transmission of the packets, thus permitting correction of the order of reception. In this context, however, no provision is made to use different radio channels for transmitting data of an application.

SUMMARY OF THE INVENTION

The method according to the present invention for operating a mobile radio network has the advantage over the background art that the control data and the payload data are transmitted with different error protection. In this manner, the demands on the error protection for the transmission of the control data need not be applied to the payload data as well which makes it possible to save transmission capacity. It is thus possible for the control data to be better protected from transmission errors without significant additional load on the transmission capacity which is required for the transmission of the payload data so that the probability of erroneous reception of the data packets is reduced.

It is particularly advantageous that the control data is transmitted in compressed form, the compression method used being an interceding in which the control data of the last transmitted payload data packet is stored in the transmitter and in the receiver, and in which, for the payload data packet to be transmitted subsequently, only the control data is transmitted which has changed compared to the control data of the last transmitted payload data packet. In this manner, it is possible to save transmission capacity for the transmission of the control data as well.

A further advantage ensues if the error protection for the control data is chosen to be higher than that for the payload data. In this manner, it is possible to ensure an error-free routing of the payload data packets in the mobile radio network and, in particular, when interceding the control data, to ensure elimination of undetected transmission errors during the control data transmission for two successive payload data packets. In this context, the payload data can be transmitted with less error protection than the control data since transmission errors during the transmission of the payload data do not have such an effect as transmission errors during the transmission of the control data and, for instance, have no effect on the routing of the data packets in the mobile radio network. Through differentiation of the error protection for the transmission of the control data and the payload data, it is possible to adapt the error protection to the transmission reliability required for the transmission of the control data and of the payload data, respectively, to save transmission bandwidth. In this context, it is not required for the payload data to be transmitted with the same error protection as the control data.

A further advantage is that the payload data is converted into the payload data packets in an application protocol layer, that the payload data packets are assigned the at least one respective header information item in a transport protocol layer and/or network protocol layer, that the control data of the at least one header information item is compressed in a convergence protocol layer, that the control data of the at least one header information item is in each case transmitted as a control data packet via a different radio link in the mobile radio network than the associated payload data packet, and that an allocation information item is in each case transmitted with the respective control data packet and the associated payload data packet, the allocation information item being used as the basis for bringing together the respective control data packet with the associated payload data packet at the receiver. In this manner, the different error protection for the control data and the payload data can be accomplished particularly easily by transmitting the payload data and the associated control data via different links having different transmission quality.

Another advantage lies in that the error protection for the control data to be sent is accomplished in a protocol layer below the convergence protocol layer. The lower the error protection is implemented within the set of protocol layers, the better can the error protection be adapted to the actual physical radio link.

BRIEF DESCRIPTION OF THE DRAWING

The FIGURE shows a set of protocol layers for the formation of a control data packet to be transmitted and of a payload data packet to be transmitted.

DETAILED DESCRIPTION

The functionalities of a mobile radio system, for example, according to the UMTS standard (Universal Mobile Telecommunication System) or according to the GSM standard (Global System for Mobile Communications) are divided into layers and, within the layers, different protocols are specified which each provide services to the higher layers and which use the services offered by the layers lying below. In this connection, each protocol exists twice within the mobile radio system or mobile radio network, namely in at least two units, the units lying in the same layer and belonging, on one side, to a transmitter and, on the other side, to a receiver. The generation of payload data packets and control data packets in a transmitter of the mobile radio network will be described hereinafter. Payload data 1 which is converted into a payload data packet 5 by an application in an application protocol layer 25 in accordance with the FIGURE and which is to be transmitted in the mobile radio network in a packet-oriented manner is initially transferred by the respective application to a transport layer protocol lying in a transport protocol layer 30 below application protocol layer 25. Here, the TCP (Transmission Control Protocol) and the UDP (User Datagram Protocol) are generally known. Also conceivable are, however, other transport layer protocols or a transparent transport protocol layer 30 through which payload data 1 to be transmitted is passed transparently without using a transport layer protocol. Transport protocol layer 30 uses services of a network protocol in a network protocol layer 35 lying below transport protocol layer 30. In this context, the network protocols are referred to, for example, as PDP (Packet Data Protocol). Transport protocol layer 30 uses the services of the PDP's to transmit payload data 1. The best known PDP's of network protocol layer 35 are the IP (Internet Protocol) and the X.25 protocol. Both the network and the transport protocols can add control data 20 to payload data 1, for example, in the form of a TCP/IP header information item or TCP/IP % header. In the FIGURE, transport protocol layer 30 adds a first header information item 10, for example, in the form of a TCP header, to payload data 1 in payload data packet 5. Subsequently, network protocol layer 35 adds a second header information item 15, for example, in the form of an IP header, to payload data packet 5 which has been extended with first header information item 10. The mobile radio system or mobile radio network specific protocols now lie below network protocol layer 35. With each PDP, data on the data connection used by the PDP in the mobile radio network is stored, for example, in a base station and in a terminal device, such as a mobile station, which forms part of and communicates with the mobile radio network. In this context, the base station can be the transmitter and the mobile station can be the receiver. The stored data can contain, for example, parameters on the service quality QOS and is referred to as PDP context. It is possible to operate a PDP with different contexts at a time, the contexts differing only in the parameters for service quality QOS. In a terminal device, therefore, an IP protocol with an IP address can be operated once with a first parameter for service quality QOS and once with a second parameter for service quality QOS. However, PDP contexts can also be based on different network protocols. Thus, provision can be made for three different network protocols to run on one terminal device: two IP protocols with different IP addresses and one X.25 protocol.

In this connection, the PDP contexts constitute users of a convergence protocol layer 40 which lies below network protocol layer 35. In convergence protocol layer 40, payload data 1 coming from a PDP context is adapted to the transmission via an air interface in that payload data 1 and/or control data 20 which has been added to payload data 1 is/are optionally compressed and, possibly, packet data streams from different PDP contexts are put together or multiplexed to form one packet data stream. Below convergence protocol layer 40 in the set of layers of the described mobile radio system, there is a link control layer 55 which optionally corrects transmission errors of the air interface by requesting erroneous packets again on the receiver side and retransmitting them on the transmitter side. Moreover, link control layer 55 optionally ensures that the order of the data packets is maintained during transmission and it segments the data packets to be transmitted into so-called PDU's (Packet Data Unit) whose length is adapted to the transmission channels used. Then, link control layer 55 uses the services of underlying layers 60, which include, for example, the MAC layer (Medium Access Control), to transmit the PDU's. The MAC layer then provides access to the actual transmission medium, selects suitable transport formats and multiplexes the different PDU's onto suitable transport channels which are mapped onto the assigned physical channels in the physical layer which lies below the MAC layer and also belongs to the layers below link control layer 55 which are denoted by reference numeral 60 in the FIGURE. The described layer or protocol hierarchy is known from the publication "Radio Interface Protocol Architecture", 3GPP TS 25.301. Some of the described layers, that is, the physical layer, the MAC layer, the link control layer 55, and the convergence protocol layer 40 also have a direct connection to a radio resource control RRC. This connection is used to transmit status information to radio resource control RRC, and to enable radio resource control RRC to configure the other protocols.

Control data 20, which is constituted by first header information item 10 and second header information item 15, is used for passing on payload data 1 in the mobile radio network, this passing on also being referred to as routing. For this purpose, this control data 20 includes, for example, a so-called "application discriminator" to differentiate the used applications, a sequence number to identify payload data packet 5 in the order of the payload data packets to be transmitted from the transmitter to the receiver, network protocol addresses of the transmitter and of the receiver, for example, in the form of IP addresses, a protocol discriminator to differentiate different protocols used, redundancy for error detection, etc. Payload data packet 5, which has been generated in this manner by transport protocol layer 30 and network protocol layer 35 and which includes first header information item 10 and second header information item 15 as well as payload data 1, is then transferred to convergence protocol layer 40 which now optimizes payload data packet 5 in the described manner for the transmission via the air interface in that it compresses, if possible, first header information item 10 and/or second header information item 15, in that it optionally compresses payload data 1, and in that, also optionally, it possibly multiplexes several incoming packet data streams from different PDP contexts onto one outgoing packet data stream.

Then, convergence protocol layer 40 uses the service provided by link control layer 55 in the form of links 65, 70, to transmit the generated and possibly multiplexed packet data stream via the air interface. In this context, the transmission of payload data packet 5 out of the packet data stream to be transmitted will be discussed in greater detail to describe the present invention. The compression of control data 20 within convergence protocol layer 40 is carried out, for example, according to the method described from and specified in the publication "Compressing TCP/IP-Headers for Low Speed Serial Links" RFC 1144, in which first header information item 10 and second header information item 15 are intercoded. In this context, control data 20 of last transmitted payload data packet 5 is stored in the transmitter and in the receiver. For payload data packet 5 to be transmitted subsequently, only the control data 20 is transmitted which has changed compared to the control data 20 of last transmitted payload data packet 5. This method is particularly advantageous because certain fields of first header information item 10 and of second header information item 15, such as the IP address of the transmitter, the application discriminator, and the protocol discriminator, change only very rarely during an existing connection between transmitter and receiver. However, the described method is also particularly vulnerable to undetected transmission errors which corrupt control data 20 since such errors affect not only the payload data packets 5 which are assigned to control data 20 but also the payload data packets 5 which are to be transmitted subsequently. Therefore, it is useful for control data 20 to be protected from errors in a special manner. When designing the mobile radio network according to the UMTS standard, the functionality of compressing first header information item 10 and second header information item 15 is implemented via a so-called "Packet Data Convergence Protocol" PDCP which lies above link control layer 55 in convergence protocol layer 40. In this context, the PDCP uses links 65, 70 of link control layer 55 to transmit data via the air interface.

In a mobile radio network according to the GSM standard, however, the functionality of compressing first header information item 10 and second header information item 15 is implemented via a so-called "Subnetwork Dependent Convergence Protocol" SNDCP in convergence protocol layer 40, the GSM mobile radio system being based on the so-called "General Packet Radio Service" GPRS for the transmission of data packets. In the UMTS standard, link control layer 55 is designed as a so-called "Radio Link Control" (RLC) and, in the GSM standard, as a so-called "Logical Link Control" (LLC).

In the following, the present invention will be described by way of example on the basis of the UMTS mobile radio system and the terminology used there, without limiting the universality, it being possible for the present invention to be used in a corresponding manner for the GSM mobile radio system and other mobile radio systems.

According to the present invention, provision is now made for different radio links from the transmitter to the receiver and thus, for different connections between convergence protocol layer 40 and the below link control layer 55 for the transmission of compressed control data 20 and the associated and, possibly, also compressed payload data 1. It is then possible to adjust transmission quality QOS (Quality of Service) differently for the different links of link control layer 55 and, for example, to choose the bit error rate to be lower for control data 20 than the bit error rate for payload data 1 and thus, to implement a higher error protection for control data 20 than for payload data 1. Then, an allocation information item 50 is added to control data 20 and payload data 1, respectively, which are separately transmitted in this manner, the allocation information item allowing payload data 1 and associated control data 20 to be unambiguously brought together at the receiver.

Thus, control data 20 can be better protected from transmission errors so as to prevent, if possible, the probability of an erroneous routing of payload data packets 5 in the mobile radio network without also having to better protect payload data 1 at the same time. Thus, the transmission bandwidth requirements for the transmission of control data 20 and payload data 1 from the transmitter to the receiver are maintained as low as possible while erroneous transmission of payload data packets 5 is still prevented to the greatest possible extent. Moreover, by using the different links 65, 70 of link control layer 55, the error protection is not added in convergence protocol layer 40 but in a protocol layer below convergence protocol layer 40. The further below convergence protocol layer 40 the error protection is implemented within the set of protocols, the better can the error protection be adapted to the actual radio link between the transmitter and the receiver. In this context, convergence protocol layer 40 simply uses a service which has a suitably low error probability and which is offered to the convergence protocol layer 40 by one of the layers 55, 60 arranged below it.

According to the FIGURE, are now compressed in convergence protocol layer 40 with the aid of a compression algorithm 75 by the specific convergence protocol used there so that first header information item 10 and second header information item 15 are available as compressed control data 80. In this context, first header information item 10 and second, header information item 15 are compressed with the aid of a stored data base 85, which contains, inter alia, the last transmitted or received control data 20. Payload data 1 can be compressed as well which, however, is not relevant for the description of the method according to the present invention and therefore will not be further discussed. Link control layer 55 now provides the respective transmission channels to accomplish first link 65 and second link 70 between convergence protocol layer 40 and the layers lying below link control layer 55. In this context, each transmission channel is assigned a specific transmission quality QOS which is negotiated between the transmitter and the receiver by radio resource control RRC during connection set-up.

Compressed control data 80 is now transmitted from convergence protocol layer 40 to layers 60 lying below link control layer 55 via a different transmission channel, i.e., a different connection than associated payload data 1. Thus, first link 65 constitutes a first transmission channel and second link 70 constitutes a second transmission channel. In this context, the intention is for compressed control data 80 to be transmitted via first transmission channel 65 whereas payload data 1 is to be transmitted via second transmission channel 70. In this connection, provision can be made to chose a transmission quality QOS for first transmission channel 65 which features the same transmission delay of, for example, 100 ms as second transmission channel 70. However, first transmission channel 65 can have a lower average bit error rate of, for example, 10-6 than second transmission channel 70 which features an average bit error rate of, for instance, 10-3. To enable payload data 1 and control data 20 to be brought together in the receiver, allocation information item 50 is added to compressed control data 80 and to payload data 1 already in convergence protocol layer 40, respectively, allowing compressed control data 80 to be assigned to payload data 1. Thus, a control data packet 45 is formed by convergence protocol layer 40 from compressed control data 80 and allocation information item 50, the control data packet being transmitted via first transmission channel 65 of link control layer 55; and a third header information item 90 being additionally added to the control data packet by the link control layer protocol in this link control layer 55 for the radio transmission from the transmitter to the receiver. Accordingly, payload data packet 5 is limited by convergence protocol layer 40 to payload; data 1 and allocation information item 50 and transmitted in this form via second transmission channel 70 in link control layer 55, a fourth header information item 95 being added to payload data packet 5 in link control layer 55 by the link control layer protocol there for, the radio transmission from the transmitter to the receiver.

The described application can be executed, for example, on a UMTS terminal device or on a GSM terminal device.

What is claimed is:

1. A method for operating a mobile radio network, comprising:
combining payload data to form payload data packets in an application protocol layer;
transmitting the payload data in the payload data packets;
assigning each of the payload data packets at least one respective header information item containing control data for routing the payload data packets in the mobile radio network, the payload data packets being assigned the at least one respective header information item in at least one of a transport protocol layer and a network protocol layer;

transmitting the control data and the payload data with different error protection;

compressing the control data of the at least one respective header information item in a convergence protocol layer;

transmitting the control data of each of the at least one respective header information item as a control data packet via a different radio link in the mobile radio network than the associated payload data packet; and transmitting an allocation information item with the respective control data packet and the associated payload data packet, the allocation information item serving as the basis for bringing together the respective control data packet with the associated payload data packet at a receiver.

2. The method as recited in claim 1, wherein the control data are transmitted in compressed form.

3. A method for operating a mobile radio network, comprising:

combining payload data to form payload data packets in an application protocol layer;

transmitting the payload data in the payload data packets;

assigning each of the payload data packets at least one respective header information item containing control data for routing the payload data packets in the mobile radio network, the payload data packets being assigned the at least one respective header information item in at least one of a transport protocol layer and a network protocol layer;

transmitting the control data and the payload data with different error protection;

compressing the control data of the at least one respective header information item in a convergence protocol layer;

transmitting the control data of each of the at least one respective header information item as a control data packet via a different radio link in the mobile radio network than the associated payload data packet; and transmitting an allocation information item with the respective control data packet and the associated payload data packet, the allocation information item serving as the basis for bringing together the respective control data packet with the associated payload data packet at a receiver, wherein the control data are transmitted in compressed form, wherein the control data are compressed according to an interceding compression method, comprising:

storing the control data of a last transmitted payload data packet in a transmitter and in the receiver, and for the payload data packet to be transmitted subsequently, transmitting only the control data that changed in comparison with the control data of the last transmitted payload data packet.

4. The method as recited in claim 1, wherein the error protection for the control data is chosen to be higher than that for the payload data.

5. The method as recited in claim 1, wherein the error protection for the control data to be transmitted is accomplished in a protocol layer below the convergence protocol layer.

* * * * *

UNITED STATES PATENT AND TRADEMARK OFFICE
CERTIFICATE OF CORRECTION

PATENT NO. : 7,263,089 B1 Page 1 of 1
APPLICATION NO. : 10/148773
DATED : August 28, 2007
INVENTOR(S) : Martin Hans et al.

It is certified that error appears in the above-identified patent and that said Letters Patent is hereby corrected as shown below:

Column 1, line 54, change "interceding" to -- intercoding --

Column 1, line 66, change "interceding" to -- intercoding --

Column 3, line 19, change "TCP/IP % header" to -- TCP/IP header. --

Signed and Sealed this

Second Day of September, 2008

JON W. DUDAS
*Director of the United States Patent and Trademark Office*